United States Patent [19]
Cobb

[11] Patent Number: 5,921,508
[45] Date of Patent: Jul. 13, 1999

[54] LOOSE WIRE HOLDER

[75] Inventor: Craig E. Cobb, Dewitt, N.Y.

[73] Assignee: Nynex Science And Technology, Inc., White Plains, N.Y.

[21] Appl. No.: 08/896,939

[22] Filed: Jul. 18, 1997

[51] Int. Cl.$^6$ .................................................. F16L 3/00
[52] U.S. Cl. ........................................... 248/49; 174/135
[58] Field of Search .......................... 248/49, 68.1, 906; 174/101, 135

[56] References Cited

U.S. PATENT DOCUMENTS

| | | | |
|---|---|---|---|
| 2,921,607 | 1/1960 | Caveney | 138/106 |
| 3,890,459 | 6/1975 | Caveney | 174/101 |
| 4,484,020 | 11/1984 | Loof et al. | 174/101 |
| 4,576,302 | 3/1986 | Smolik | 248/906 X |
| 5,386,959 | 2/1995 | Laughlin et al. | 248/906 X |
| 5,516,068 | 5/1996 | Rice | 248/906 X |

*Primary Examiner*—Ramon O. Ramirez
*Attorney, Agent, or Firm*—Ohlandt, Greeley, Ruggiero & Perle

[57] ABSTRACT

A holder holds a plurality of cross-connect cables between two structures. The holder comprises an enclosure that includes at least a first portion and a second portion. Each portion has a plurality of slots. A portion of at least one cross-connect cable coupled between the two structures, is maintained in the enclosure between a slot on the first portion and a slot on the second portion. Accordingly the holder provides for neat and orderly holding of the otherwise loose cables.

26 Claims, 3 Drawing Sheets

LOOSE WIRE HOLDER

BACKGROUND OF THE INVENTION

1. Field of the Invention

The present invention relates to wire holders and, more particularly, to a wire holder that holds numerous cross-connect cables in a neat and orderly manner to minimize cable entanglement.

2. Discussion of the Prior Art

In a network system, communication pathways are established between computers and other system devices by connecting cross-connect cables between concentrators and patch panels (also known as cross-connect panels). The concentrators allow local area connections onto the network, via an ethernet, token lan and so forth; and the patch panels are coupled to the computers. As more cross-connections are established, the number of cross-connect cables, coupled between the concentrators and the patch panels, increases and the area at and around the concentrators and the patch panels becomes cluttered with numerous, entangled cross-connect cables. This results in what has been termed the spaghetti factor, i.e., a mass entanglement of dangling cross-connect cables, as shown in FIG. 1. The spaghetti factor becomes even more prevalent as different lengths of cross-connect cables are utilized.

One problem with numerous entangled cross-connect cables is that they pose physical hazards to people working at or around the entangled cables. For instance, a person walking through the area may trip over the cables and be injured.

Another problem is that entangled cross-connect cables also hinder cross-connect operations by making it difficult to identify particular cross-connect cables and their associated cross-connections. In order to locate a particular cross-connect cable, the entangled cables must be sorted and unraveled which require additional time that is better spent performing the actual connection. As can be seen in FIG. 1, the entangled cables also hinder access to the concentrators and the patch panels.

The mass entanglement of the cross-connect cables may also lead to electrical and mechanical connection problems. In a typical scenario, cross-connect cables connected between the concentrator and the patch panel hang freely or dangle therebetween. As the cables become cluttered or entangled, more weight is placed on the cables and tension on the entangled cables is increased. The increased cable tension and weight may cause the cross-connect cables to be damaged (i.e., to break) or become dislodged from either the concentrator or the patch panel.

There is a desire to eliminate the danger posed by entangled cross-connect cables, to make it easier to identify a particular cross-connect cable and its associated cross-connections and to increase electrical and mechanical reliability of the cross-connections. There is also a desire to improve accessibility to the area at and around the concentrators and the patch panels.

SUMMARY OF THE INVENTION

It is an object of the present invention to provide an apparatus for holding a plurality of cross-connect cables in a neat and orderly manner, in order to minimize cable entanglement.

It is another object of the present invention to provide such an apparatus that allows for easy access and identification of particular cross-connect cables and their associated cross-connections.

It is a further object of the present invention to provide such an apparatus that minimizes the physical hazards caused by a mass entanglement of cross-connect cables.

These and other objects of the present invention are provided by a loose wire or cable holder that holds a plurality of cross-connect cables connected between two structures, in a neat and orderly manner. The holder comprises an enclosure that includes a first portion and a second portion. Each portion has a plurality of slots. A portion of at least one cross-connect cable is maintained in the enclosure between a slot in the first portion and a slot in the second portion.

BRIEF DESCRIPTION OF THE DRAWINGS

The foregoing and other objects and advantages of the present invention will be more apparent from the following detailed explanation of the preferred embodiments in connection with the accompany drawings in which.

DETAILED DESCRIPTION OF A PREFERRED EMBODIMENT

The term "cross-connect cable" used herein refers to a cable connected between a concentrator and a patch panel, as described above. Cross-connect cable used herein also refers to any cable that is connected between two ports, two structures, and so forth.

Figure 1:
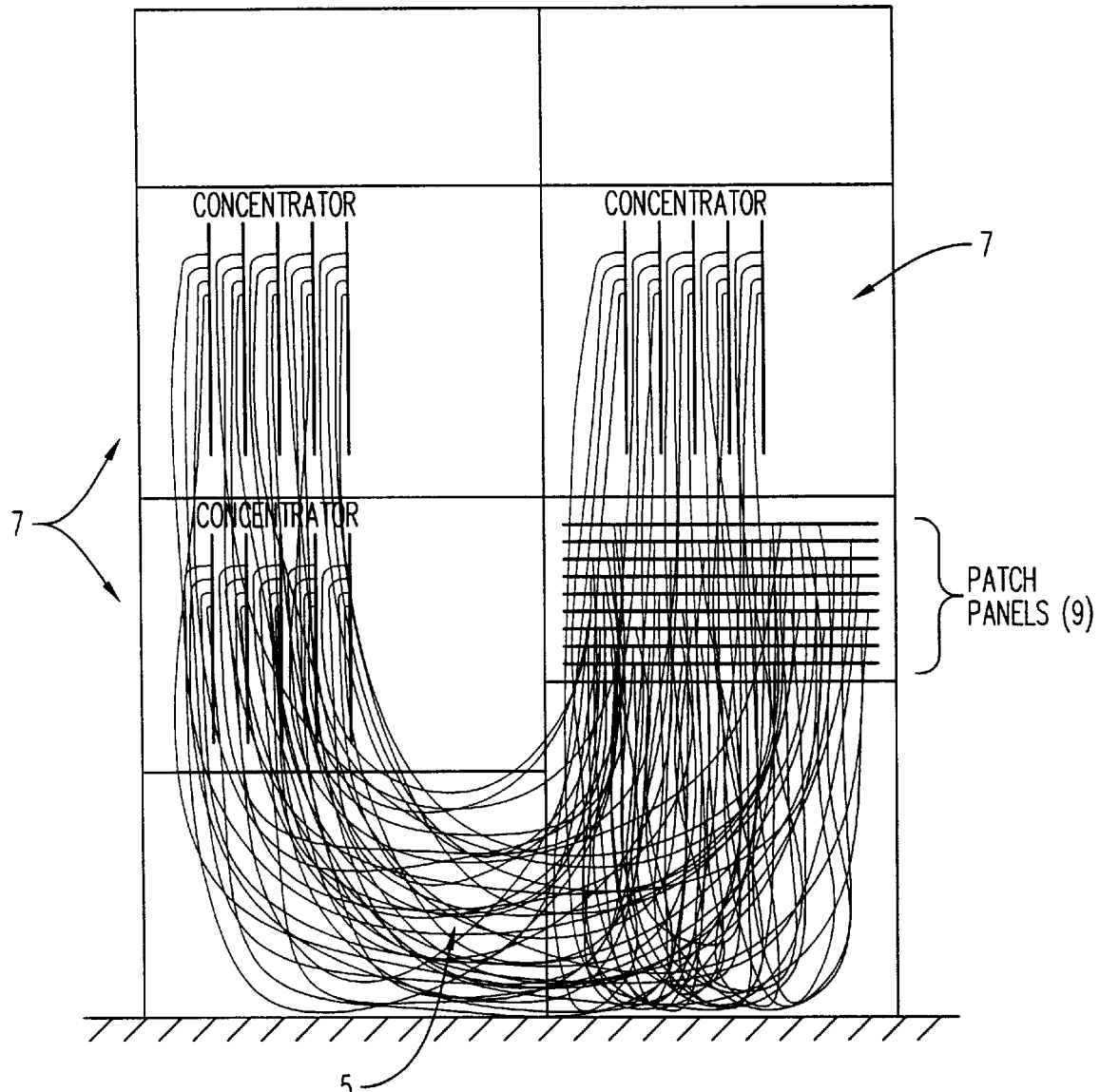
FIG. 1 illustrates an example of the prior art cross-connect panels and concentrators having a plurality of cross-connect cables coupled therebetween.

Referring to the figures and, in particular, FIG. 1, there is shown a plurality of loose wires or cables generally represented by reference numeral 5. The plurality of loose cables 5 are connected at one end to a concentrator 7, and at the other end to a patch panel 9.

Figure 2:
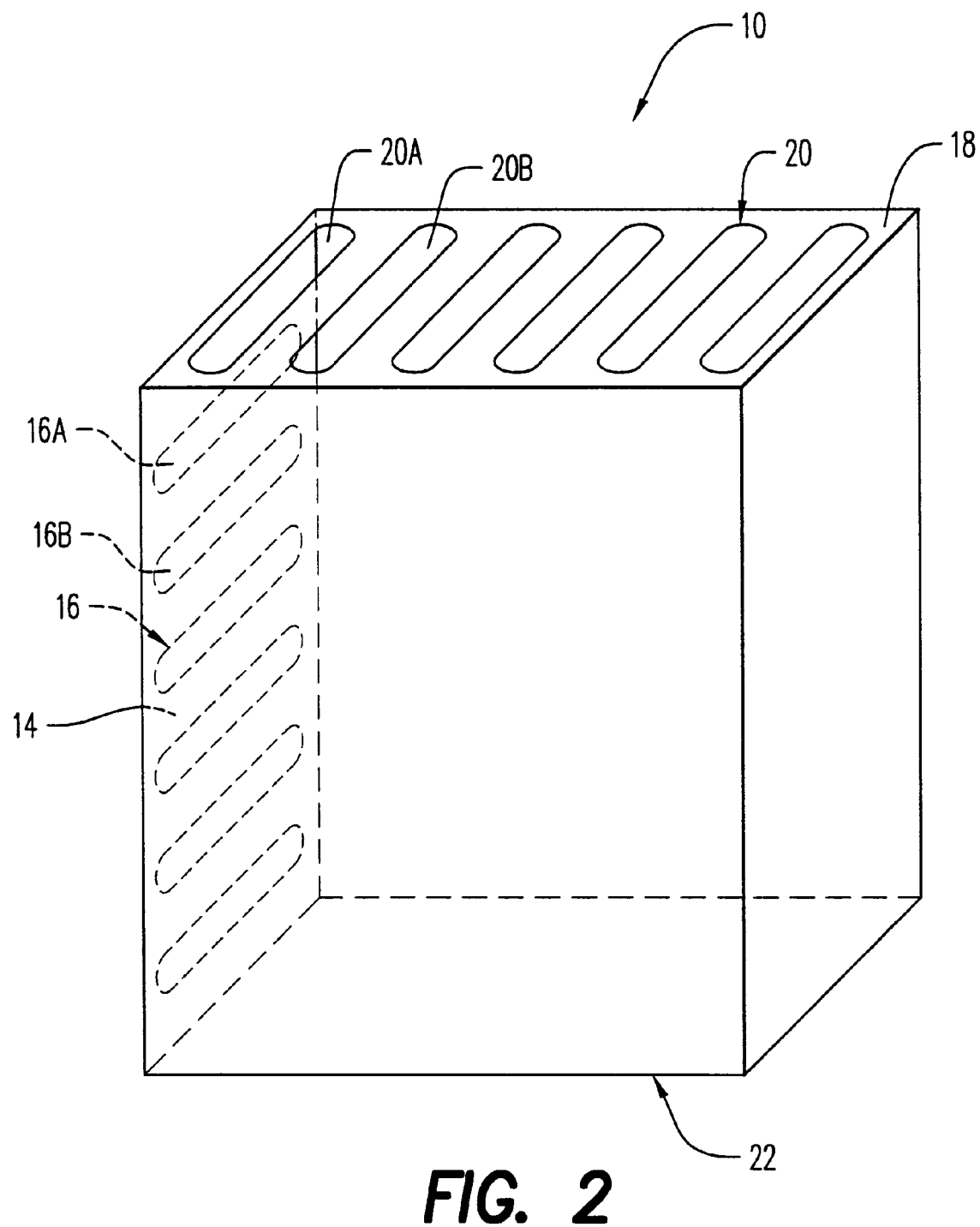
FIG. 2 illustrates a loose wire holder in accordance with the present invention.
Figure 3:
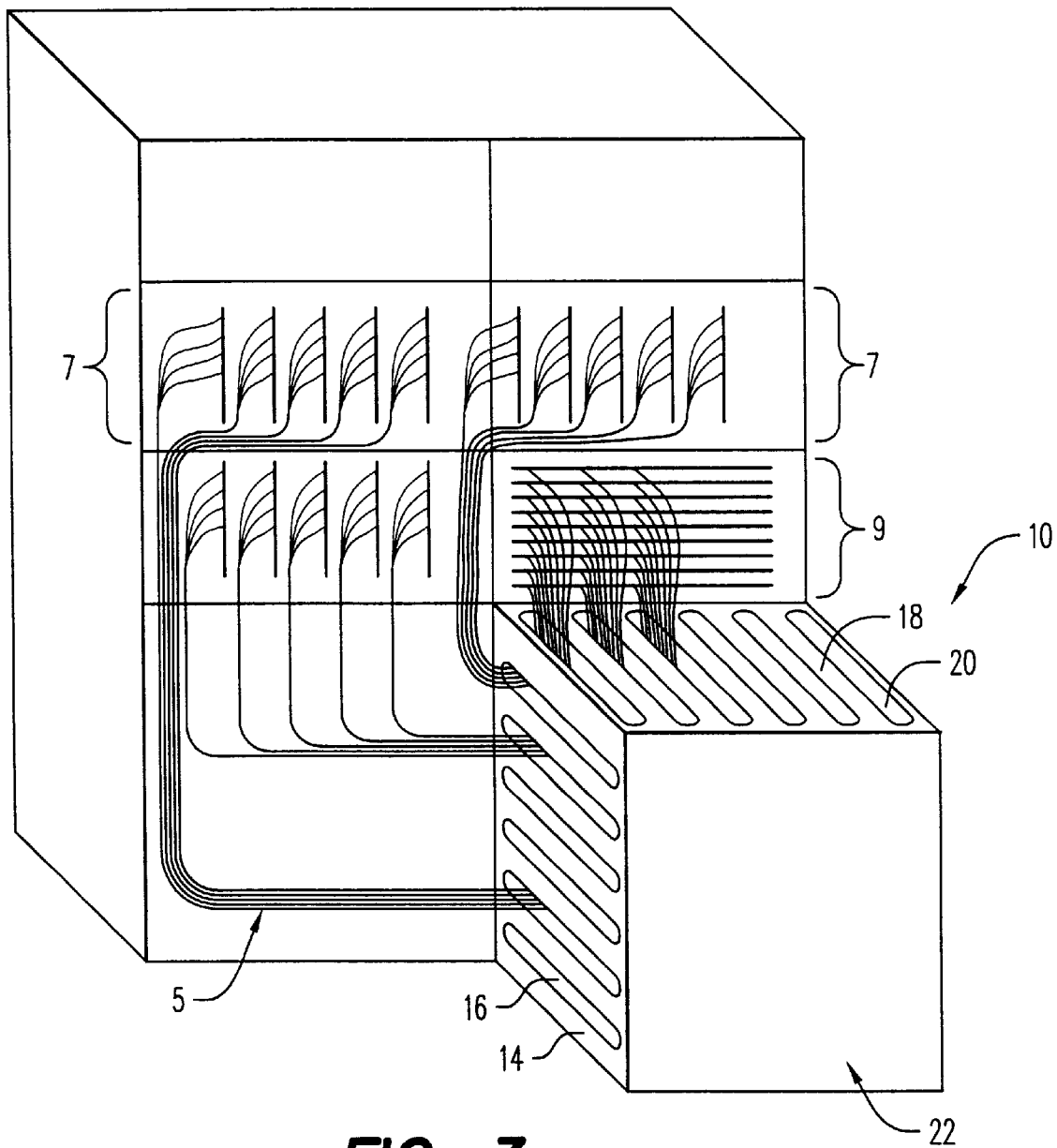
FIG. 3 illustrates a plurality of wires held by the loose wire holder of the present invention.

FIGS. 2 and 3 illustrates a loose wire or cable holder 10 in accordance with the present invention. The holder 10 is an enclosure, preferably having a box-shape, that includes a side portion 14, an upper portion 18 and a front portion 22. The side portion 14 is located on a side of the holder 10 and has a plurality of cable slots 16, each capable of receiving a portion of at least one cross-connect cable 5 therethrough. The upper portion 18 is located at a top of the holder 10 and includes a plurality of cable slots 20, each also capable of receiving a portion of at least cable 5 therethrough. At least one cross-connect cable 5 can thus be neatly and orderly maintained in holder 10 between one of a plurality of slots 16 of side portion 14 and one of a plurality of slots 20 of upper portion 18. The front portion 22 can be opened or removed, by conventional means, such as a hinge to provide access into holder 10 and the cross-connect cables 5 held therein.

It is preferred that holder 10 is a box having a length of approximately 22 inches, a width of approximately 11 inches and a height of approximately 13 inches. Upper portion 18 is preferably a top panel of the box. Side portion 14 is preferably a side panel of the box. It is also preferred that upper portion 18 (i.e., the top panel) is contiguous to side portion 14 (i.e., the side panel). Holder 10 is preferably formed of plastic or metal flame-retardent material. Such materials include, for example, Kelvar. When formed of a non flame-retardant material, the enclosure can be treated with an additive to render it flame-retardent.

It is also preferred that each slots 16, 20 has a width of approximately 0.2 inches and is positioned at distance of approximately 1 to 2 inches from an adjacent slot. Each slot 16 is preferably positioned in a substantially horizontal plane (i.e., horizontally slotted) in side portion 14. The plurality of slots 16 is preferably vertically arranged along a vertical axis of side portion 14. Each slot 20 is preferably positioned between the front and back of holder 10 (i.e., a front to back slot). The plurality of slots 20 is, preferably, positioned in a substantially horizontal plane in upper portion 18. Slots 16, 20 are preferably finger-shaped and capable of accepting therethrough the plurality of cross-connect cables 5.

Slots 16, 20 work in combination to hold in a neat and orderly manner the plurality of cross-connect cables 5 in the holder 10. Accordingly, it is preferred that the axial extent of each slot 16, 20 be in the same direction, as shown in FIG. 2. Also, the first of each pair of slots 16 and 20 shown as 16A, 20A in FIG. 2, should be adjacent each other, and there, preferably, is a corresponding number of slots 16 and 20. As the first cross-cable 5 is passed into slots 16A, 20A, the second cross-cable is passed into slots 16B, 20B. Accordingly, the cross-cables produce an arcuate effect of different diameter, thereby keeping each cross-cable separate from the cross-cables in adjacent slots.

While cable slots 16, 20 preferably have a finger-like shape and are linearly arrayed in their respective portions 14, 18 as shown in FIG. 2, cable slots 16, 20 may be configured in any size and shape depending on the amount and size of the cross-connect cables 5 being utilized. Slots 16, 18 can also be positioned in any manner and orientation on their respective portions 14, 18, respectively, depending on the placement of holder 10 with respect to the concentrators 7 and the patch panels 9. Each portion 14, 18 may include any number of respective slots 16, 20, but again a corresponding number of slots 16, 20 is preferred.

The holder 10 may also be constructed in varying sizes and shapes and have other side portions having cable slots thereon. For instance, instead of having portions 14, 18 respectively, located on a side and top of the holder 10, portions 14, 18 can both be located on a side of the holder 10.

Accordingly, the size, shape, number and placement of the slots, and the size and shape of holder 10 can be customized according to various factors, including the number of cross-connections, the size and length of the cross-connect cables, and the orientation of the concentrators with respect to the patch panels.

An example of an operation of inserting a cross-connect cable through loose wire holder 10 will now be described. Initially, one end of a cross-connect cable 5 is connected to the concentrator 7. The other end of the cable 5 is inserted through one of a plurality of slots 14 into the holder 10, out of one of a plurality of slots 20 and connected to the patch panel 9. The choice of utilizing the particular slots 14, 20 depends on various factors, including the length of the cross-connect cable 5, the location of the concentrator 7 and the patch panels 9 with respect to holder 10. For instance, it would be preferable to insert a shorter cable 5 with less cable slack through an uppermost slot 16. As shown in FIG. 3, loose wire holder 10 can hold a plurality of cross-connect cables 5 therein in a neat and orderly manner and supports the cables by preventing them from dangling freely.

The present invention provides holder 10 that maintains cross-connect cables 5 in a neat and orderly manner, eliminates mass entanglement of the cross-connect cables and decreases the likelihood of injury to individuals working at or around the cables. The present invention also supports the cross-connect cables 5 and decreases cable tension, thereby increasing electrical and mechanical reliability of the cross-connections. The present invention also makes it easy to identify particular cross-connect cables and, thus, simplifies the performance of rerouting operations.

The invention having thus been described with particular reference to the preferred forms thereof, it will be obvious that various changes and modifications may be made therein without departing from the spirit and scope of the invention as defined in the appended claims.

What I claim is:

1. A holder for holding a plurality of cross-connect cables between two structures in a neat and orderly manner, said holder comprising:

an enclosure having at least a first portion and a second portion, said first and second portions each having a plurality of slots, each of said plurality of slots adapted to receive therethrough from a region external to said enclosure at least one of said plurality of cross-connect cables, wherein a portion of said at least one of said plurality of cross-connect cables is maintained in said enclosure between a slot of said plurality of slots in said first portion and a slot of said plurality of slots in said second portion.

2. The holder as recited in claim 1, wherein said enclosure is a box.

3. The holder as recited in claim 1, wherein said enclosure is constructed of a flame-retardent material.

4. The holder as recited in claim 1, wherein said enclosure is treated with a flame-retardant additive.

5. The holder as recited in claim 1, wherein said enclosure is formed of plastic that is flame-retardent.

6. The holder as recited in claim 1, wherein said enclosure is formed of metal that is flame-retardent.

7. The holder as recited in claim 1, wherein said plurality of slots on each of said first and second portions are linearly arrayed.

8. The holder as recited in claim 1, wherein said enclosure further comprises means for accessing said at least one cross-connect cable in said enclosure.

9. The holder as recited in claim 8, wherein said access means includes a movable portion.

10. The holder as recited in claim 1, wherein said first portion is located on a side of said enclosure.

11. The holder as recited in claim 1, wherein each of said plurality of slots has a width of approximately 0.2 inches.

12. The holder as recited in claim 1, wherein said plurality of slots of said first portion is positioned at a distance of approximately 1 to 2 inches from each other.

13. The holder as recited in claim 1, wherein said plurality of slots of said first portion are vertically arranged along a vertical axis of said first portion.

14. The holder as recited in claim 1, wherein said plurality of slots of said second portion is positioned at a distance of approximately 1 to 2 inches from each other.

15. The holder as recited in claim 1, wherein said enclosure has a length of approximately 22 inches, a width of approximately 11 inches and a height of approximately 13 inches.

16. The holder as recited in claim 1, wherein said first portion is a side panel of said enclosure.

17. The holder as recited in claim 1, wherein at least one of said plurality of slots of said first portion is finger-shaped.

18. A holder for holding a plurality of cross-connect cables between two structures in a neat and orderly manner, said holder comprising:

an enclosure having at least a first portion and a second portion, said first and second portions each having a plurality of slots, each of said plurality of slots adapted to receive therethrough at least one of said plurality of cross-connect cables, wherein a portion of said at least one of said plurality of cross-connect cables is maintained in said enclosure between a slot of said plurality of slots in said first portion and a slot of said plurality of slots in said second portion, wherein said second portion is contiguous to said first portion.

19. A holder for holding a plurality of cross-connect cables between two structures in a neat and orderly manner, said holder comprising:

an enclosure having at least a first portion and a second portion, said first and second portions each having a plurality of slots, each of said plurality of slots adapted to receive therethrough at least one of said plurality of cross-connect cables, wherein a portion of said at least one of said plurality of cross-connect cables is maintained in said enclosure between a slot of said plurality of slots in said first portion and a slot of said plurality of slots in said second portion, wherein said second portion is a panel of said enclosure contiguous to said first portion.

20. A holder for holding a plurality of cross-connect cables between two structures in a neat and orderly manner, said holder comprising:

an enclosure having at least a first portion and a second portion, said first and second portions each having a plurality of slots, each of said plurality of slots adapted to receive therethrough at least one of said plurality of cross-connect cables, wherein a portion of said at least one of said plurality of cross-connect cables is maintained in said enclosure between a slot of said plurality of slots in said first portion and a slot of said plurality of slots in said second portion, wherein said first portion is a first panel of said enclosure and said second portion is a second panel of said enclosure, said second panel being contiguous to said first panel.

21. A holder for holding a plurality of cross-connect cables between two structures in a neat and orderly manner, said holder comprising:

an enclosure having at least a first portion and a second portion, said first and second portions each having a plurality of slots, each of said plurality of slots adapted to receive therethrough at least one of said plurality of cross-connect cables, wherein a portion of said at least one of said plurality of cross-connect cables is maintained in said enclosure between a slot of said plurality of slots in said first portion and a slot of said plurality of slots in said second portion, wherein said second portion is located on a top of said enclosure.

22. A holder for holding a plurality of cross-connect cables between two structures in a neat and orderly manner, said holder comprising:

an enclosure having at least a first portion and a second portion, said first and second portions each having a plurality of slots, each of said plurality of slots adapted to receive therethrough at least one of said plurality of cross-connect cables, wherein a portion of said at least one of said plurality of cross-connect cables is maintained in said enclosure between a slot of said plurality of slots in said first portion and a slot of said plurality of slots in said second portion, wherein each of said plurality of slots of said first portion is positioned in a substantially horizontal plane in said first portion.

23. A holder for holding a plurality of cross-connect cables between two structures in a neat and orderly manner, said holder comprising:

an enclosure having at least a first portion and a second portion, said first and second portions each having a plurality of slots, each of said plurality of slots adapted to receive therethrough at least one of said plurality of cross-connect cables, wherein a portion of said at least one of said plurality of cross-connect cables is maintained in said enclosure between a slot of said plurality of slots in said first portion and a slot of said plurality of slots in said second portion, wherein each of said plurality of slots of said second portion is positioned between a front and a back of said enclosure.

24. A holder for holding a plurality of cross-connect cables between two structures in a neat and orderly manner, said holder comprising:

an enclosure having at least a first portion and a second portion, said first and second portions each having a plurality of slots, each of said plurality of slots adapted to receive therethrough at least one of said plurality of cross-connect cables, wherein a portion of said at least one of said plurality of cross-connect cables is maintained in said enclosure between a slot of said plurality of slots in said first portion and a slot of said plurality of slots in said second portion, wherein said plurality of slots in said second portion are positioned substantially in a horizontal plane in said second portion.

25. A holder for holding a plurality of cross-connect cables between two structures in a neat and orderly manner, said holder comprising:

an enclosure having at least a first portion and a second portion, said first and second portions each having a plurality of slots, each of said plurality of slots adapted to receive therethrough at least one of said plurality of cross-connect cables, wherein a portion of said at least one of said plurality of cross-connect cables is maintained in said enclosure between a slot of said plurality of slots in said first portion and a slot of said plurality of slots in said second portion, wherein said second portion is a top panel of said enclosure.

26. A method for holding a portion of at least one cross-connect cable in a cable holder between two structures, said cable holder comprising an enclosure having at least a first portion and a second portion, said first and second portions each having a plurality of openings, each of said plurality of openings adapted to receive therethrough at least one cross-connect cable, said method comprising the step of:

inserting a portion of said at least one cross-connect cable in said enclosure between an opening on said first portion and an opening on said second portion, wherein a first end of said at least one cross-connect cable is connected to one of the two structures and a second end of said at least one cross-connect cable is connected to the other of the two structures.

* * * * *